United States Patent
Asatsuke et al.

(10) Patent No.: US 8,973,454 B2
(45) Date of Patent: Mar. 10, 2015

(54) POWER TRANSMITTING APPARATUSES

(75) Inventors: Shouji Asatsuke, Hamamatsu (JP); Akio Oishi, Hamamatsu (JP); Tatsuyuki Ohashi, Hamamatsu (JP); Jun Ishimura, Hamamatsu (JP); Keiichi Ishikawa, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/225,334

(22) Filed: Sep. 2, 2011

(65) Prior Publication Data

US 2012/0061198 A1    Mar. 15, 2012

Related U.S. Application Data (63) Continuation of application No. PCT/JP2010/053392, filed on Mar. 3, 2010.

(30) Foreign Application Priority Data

Mar. 6, 2009   (JP) ................ 2009-052769

(51) Int. Cl.
*F16H 3/08*   (2006.01)
*F16H 59/00*  (2006.01)
(Continued)

(52) U.S. Cl.
CPC ............ *F16D 25/10* (2013.01); *F16D 21/06* (2013.01); *F16D 23/06* (2013.01);
(Continued)

(58) Field of Classification Search
CPC .......... F16H 3/006; F16H 3/08; F16H 3/089; F16H 3/093; F16H 3/30; F16H 61/88; F16H 2003/0931; F16H 2200/006; F16D 25/0638; F16D 25/10; F16D 2021/0661
USPC ......... 74/331, 335, 718, 750, 730.1, 339, 340
See application file for complete search history.

(56) References Cited

U.S. PATENT DOCUMENTS 4,329,885 A * 5/1982 Morscheck .................. 74/339
4,860,861 A * 8/1989 Gooch et al. .............. 192/3.26
(Continued)

FOREIGN PATENT DOCUMENTS

| JP | 03-204477 | 9/1991 |
| JP | 04-219557 | 8/1992 |

(Continued)

OTHER PUBLICATIONS

International Search Report for PCT/JP2010/053392 mailed May 11, 2010.
(Continued)

*Primary Examiner* — David M Fenstermacher
*Assistant Examiner* — Jake Cook
(74) *Attorney, Agent, or Firm* — Knobbe Martens Olson & Bear LLP (57) ABSTRACT

A power transmitting apparatus with improved power transmitting efficiency and reduced lag time for shifting speeds can comprise a starting clutch mechanism configured to selectively transmit and cut off driving power of engine to wheels of a vehicle, a plurality of gear-stage clutch devices operatively positioned to transmit power between the starting clutch mechanism and the wheels, an input and an output of the plurality of gear-stage clutch devices configured at predetermined gear ratios, and a gear-stage selecting device configured to select any one of the gear-stage clutch devices in accordance with a vehicle operating condition and selectively set a gear ratio for power transmission from the engine to the wheels. The gear-stage clutch devices can comprise alternately arranged driving clutch discs and driven clutch discs, and hydraulic pistons. The hydraulic pistons can be configured to selectively engage or disengage the driving clutch discs and driven clutch discs such that driving power of the engine is transmitted to the wheels at a corresponding predetermined gear ratio when the driving clutch discs and driven clutch discs are engaged.

14 Claims, 9 Drawing Sheets

(51) Int. Cl.

| | | |
|---|---|---|
| *F16H 61/00* | (2006.01) | |
| *F16H 63/00* | (2006.01) | |
| *F16D 25/10* | (2006.01) | |
| *F16D 21/06* | (2006.01) | |
| *F16D 23/06* | (2006.01) | |
| *F16D 25/0638* | (2006.01) | |
| *F16H 3/093* | (2006.01) | |
| *F16H 45/02* | (2006.01) | |
| *F16H 45/00* | (2006.01) | |

(52) U.S. Cl.
CPC ........... *F16D 25/0638* (2013.01); *F16H 3/093* (2013.01); *F16H 45/02* (2013.01); *F16D 2021/0661* (2013.01); *F16D 2023/0643* (2013.01); *F16D 2023/0693* (2013.01); *F16H 2003/0938* (2013.01); *F16H 2045/005* (2013.01)
USPC .............................................. 74/331; 74/335

(56) References Cited

U.S. PATENT DOCUMENTS

| | | | | |
|---|---|---|---|---|
| 5,385,064 | A * | 1/1995 | Reece | 74/331 |
| 6,591,705 | B1 * | 7/2003 | Reik et al. | 74/343 |
| 7,347,117 | B2 * | 3/2008 | Nassif | 74/335 |
| 7,891,263 | B2 * | 2/2011 | Mowbray et al. | 74/340 |
| 2002/0020597 | A1 | 2/2002 | Cho | |
| 2004/0182668 | A1 * | 9/2004 | Biermann et al. | 192/3.51 |
| 2008/0134817 | A1 * | 6/2008 | Bjorck et al. | 74/330 |
| 2009/0019959 | A1 * | 1/2009 | Raszkowski | 74/331 |
| 2010/0108459 | A1 * | 5/2010 | Amano et al. | 192/85.39 |

FOREIGN PATENT DOCUMENTS

| | | |
|---|---|---|
| JP | 07-042761 | 2/1995 |
| JP | 2007-002926 | 1/2007 |

OTHER PUBLICATIONS

Microfilm of the specification and drawings annexed to the request of Japanese utility Model Application No. 118068/1987 (Laid-open No. 024760/1989), Feb. 10, 1989, Nissan Diesel Motor Co., Ltd.

Bu Yan, Mechanical Transmission Device Design Manual Part 2, Published Dec. 1998, pp. 592-593 (with translation).

* cited by examiner

| | | Start speed change clutch | | Gear stage clutch mechanism | | | | |
|---|---|---|---|---|---|---|---|---|
| | | Clutch operation | | Selection | | | Forward stage 3 - R selection | |
| | | 1st clutch device | 2nd clutch device | Start stage | Forward stage 1 | Forward stage 2 | Forward stage 3 | Reverse |
| (1) | Reverse | ○ | | | | | | ○ |
| (2) | Reverse in-gear | ○ | | × | | | | ○ |
| (3) | Neutral – 1 | × | ○ | × | × | × | × | × |
| | Neutral – 2 | ○ | × | × | × | × | × | × |
| | Neutral – 3 | × | × | × | × | × | × | × |
| (4) | Start stage in-gear | ○ | ○ | ○ | | | | |
| (5) | Start – 1 | ○ | × | ○ | | | | |
| | Start – 2 | ○ | ○ | ○ | | | | |
| (6) | Forward stage 1 run – 1 | ○ | × | ○ | ○ | | | |
| | Forward stage 1 run – 2 | ○ | ○ | ○ | ○ | | | |
| | Forward stage 1 run – 3 | ○ | × | ○ | ○ | | | |
| (7) | Gear selection (1-2) | × | ○ | × | ○ | ○ | | |
| (8) | Forward stage 2 speed change – 1 | ○ | Same as (8) | ○ | | ○ | | |
| | Forward stage 2 speed change – 2 | ○ | Same as (8) | ○ | | ○ | | |
| (9) | Forward stage 2 run – 1 | × | × | | | ○ | | |
| | Forward stage 2 run – 2 | ○ | ○ | ○ | | ○ | | |
| | Forward stage 2 run – 3 | × | × | | | ○ | | |
| (10) | Gear selection (2-1) | × | × | ○ | | ○ | ○ | × |
| (11) | Forward stage 1 speed change – 1 | ○ | Same as (8) | | | | ○ | |
| | Forward stage 1 speed change – 2 | ○ | Same as (8) | | | | ○ | |
| (12) | Gear selection (1-3) | × | × | | | | ○ | |
| (13) | Forward stage 3 speed change – 1 | ○ | Same as (8) | | | | ○ | |
| | Forward stage 3 speed change – 2 | ○ | Same as (8) | | | | ○ | |
| (14) | Forward stage 3 run – 1 | ○ | Same as (8) | | | | ○ | |
| | Forward stage 3 run – 2 | ○ | Same as (8) | | | | ○ | |
| | Forward stage 3 run – 3 | ○ | Same as (8) | | | | ○ | |

POWER TRANSMITTING APPARATUSES

CROSS-REFERENCE TO RELATED APPLICATIONS

This application is a continuation of PCT Application No. PCT/JP2010/053392, filed on Mar. 3, 2010, which claims priority to Japanese Application No. 2009-052769, filed on Mar. 6, 2009, the entire contents of each of which are hereby incorporated by reference.

BACKGROUND OF THE INVENTIONS

1. Field of the Inventions

The present inventions relate to power transmitting apparatuses, such as vehicle transmissions, that selectively transmit or cut off power from an engine to the wheels of a vehicle.

2. Description of Related Art

Two known types of power transmitting apparatuses for selectively transmitting or cutting off power from an engine to the wheels of vehicle are manual transmissions (MT) in which speeds are shifted manually, and automatic transmissions (AT) in which speeds are shifted automatically by a torque converter. The AT can easily shift speeds; however, since the AT has poor power transmitting efficiency, an AMT-type power transmitting apparatus has been proposed that can automatically shift speeds without using a torque converter.

The AMT-type power transmitting apparatus comprises a starting clutch mechanism (start speed change clutch mechanism) for transmitting or cutting off power transmission between an engine and wheels of a vehicle, and a plurality of gear-stage clutch devices whose input and output are set at predetermined gear ratios. The plurality of gear-stage clutch devices comprises a synchronizing mechanism and a dog clutch and is configured so that the gear ratio during power transmission from the engine to the wheels can be selected by connecting the dog clutch to any one of the gear-stage clutch devices.

SUMMARY OF THE INVENTIONS

An aspect of at least one of the inventions disclosed herein includes the realization that the power transmitting efficiency of power transmitting apparatuses can be improved and the time required to shifts speeds can be reduced.

Prior power transmitting apparatuses experience a long lag in the time required to shift speeds since setting the gear ratio by selecting a gear stage from a synchronizing mechanism and connecting a dog clutch can occupy a large amount of time. Also, the time to shift speeds is increased because prior power transmitting apparatuses must first synchronize the synchronizing mechanism and then engage the dog clutch, which sequential process requires a substantially long time.

Thus, in accordance with an embodiment, a power transmitting apparatus can comprise a starting clutch mechanism configured to selectively transmit and cut off driving power of engine to wheels of a vehicle, a plurality of gear-stage clutch devices operatively positioned to transmit power between the starting clutch mechanism and the wheels, an input and an output of the plurality of gear-stage clutch devices configured at predetermined gear ratios, and a gear-stage selecting device configured to select any one of the gear-stage clutch devices in accordance with a vehicle operating condition and selectively set a gear ratio for power transmission from the engine to the wheels. The gear-stage clutch devices can comprise alternately arranged driving clutch discs and driven clutch discs, and hydraulic pistons. The hydraulic pistons can be configured to selectively engage or disengage the driving clutch discs and driven clutch discs such that driving power of the engine is transmitted to the wheels at a corresponding predetermined gear ratio when the driving clutch discs and driven clutch discs are engaged.

In some embodiments, the gear-stage clutch devices can be configured to selectively engage the driving clutch discs and driven clutch discs at different gear ratios in accordance with an operating direction of the hydraulic pistons.

In some embodiments, a power transmitting apparatus can comprise a torque converter and a starting clutch mechanism. The starting clutch mechanism can comprise a first clutch device for transmitting the driving power of engine to the wheels through the torque converter, a second clutch device for transmitting driving power of engine to the wheels without a power transmitting system of the torque converter, and a control device for selectively actuating the first and second clutch device in accordance with a vehicle operating condition.

In some embodiments, a starting clutch mechanism can comprise a first clutch device for even-number gear stages connectable with gear-stage clutch devices of even-number stages and a second clutch device for odd-number gear stages connectable with gear-stage clutch devices of odd-number stages.

In some embodiments, a starting clutch mechanism can comprise frictional materials having first frictional characteristics wherein a first coefficient of dynamic friction continuously diminishes as time elapses, and gear-stage clutch devices can comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period.

In embodiments where the gear-stage clutch devices comprise alternately arranged driving clutch discs and driven clutch discs, and hydraulic pistons that can selectively engage or disengage the driving clutch discs and driven clutch discs such that driving power of the engine is transmitted to the wheels at a corresponding predetermined gear ratio when the driving clutch discs and driven clutch discs are engaged, the power transmitting efficiency of the power transmitting apparatus can be improved and the lag time for shifting speeds can be reduced.

In embodiments where the gear-stage clutch devices can selectively engage the driving clutch discs and driven clutch discs at different gear ratios in accordance with an operating direction of the hydraulic pistons, the driving clutch discs and the driven clutch discs of different gear ratios can share a hydraulic piston, and accordingly the size (especially the axial size) of the power transmitting apparatus and the number of structural elements of the apparatus can be reduced, and thus its manufacturing cost can be reduced.

In embodiments where a starting clutch mechanism comprises a first clutch device for transmitting driving power of engine to the wheels through a torque converter, a second clutch device for transmitting driving power of engine to the wheels without a power transmitting system of the torque converter, and a control device for selectively actuating the first and second clutch devices in accordance with a vehicle operating condition, a load on the starting clutch mechanism can be reduced by sharing the load between the first and second clutch devices and can reduce the time lag for shifting speeds.

In embodiments where a starting clutch mechanism comprises a first clutch device for even-number gear stages connectable with gear-stage clutch devices of even-number stages and a second clutch device for odd-number gear stages connectable with gear-stage clutch devices of odd-number stages, a load on the starting clutch mechanism can be reduced by sharing the load between the first clutch device for even-number gear stages and the second clutch device for odd-number gear stages and can reduce the time lag for shifting speeds.

In embodiments where a starting clutch mechanism can comprise frictional materials having first frictional characteristics wherein a first coefficient of dynamic friction continuously diminishes as time elapses, and gear-stage clutch devices can comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period, different preferable characteristics can be assigned respectively to the starting clutch mechanism and the gear-stage clutch devices.

DETAILED DESCRIPTION OF THE PREFERRED EMBODIMENTS

Figure 1:
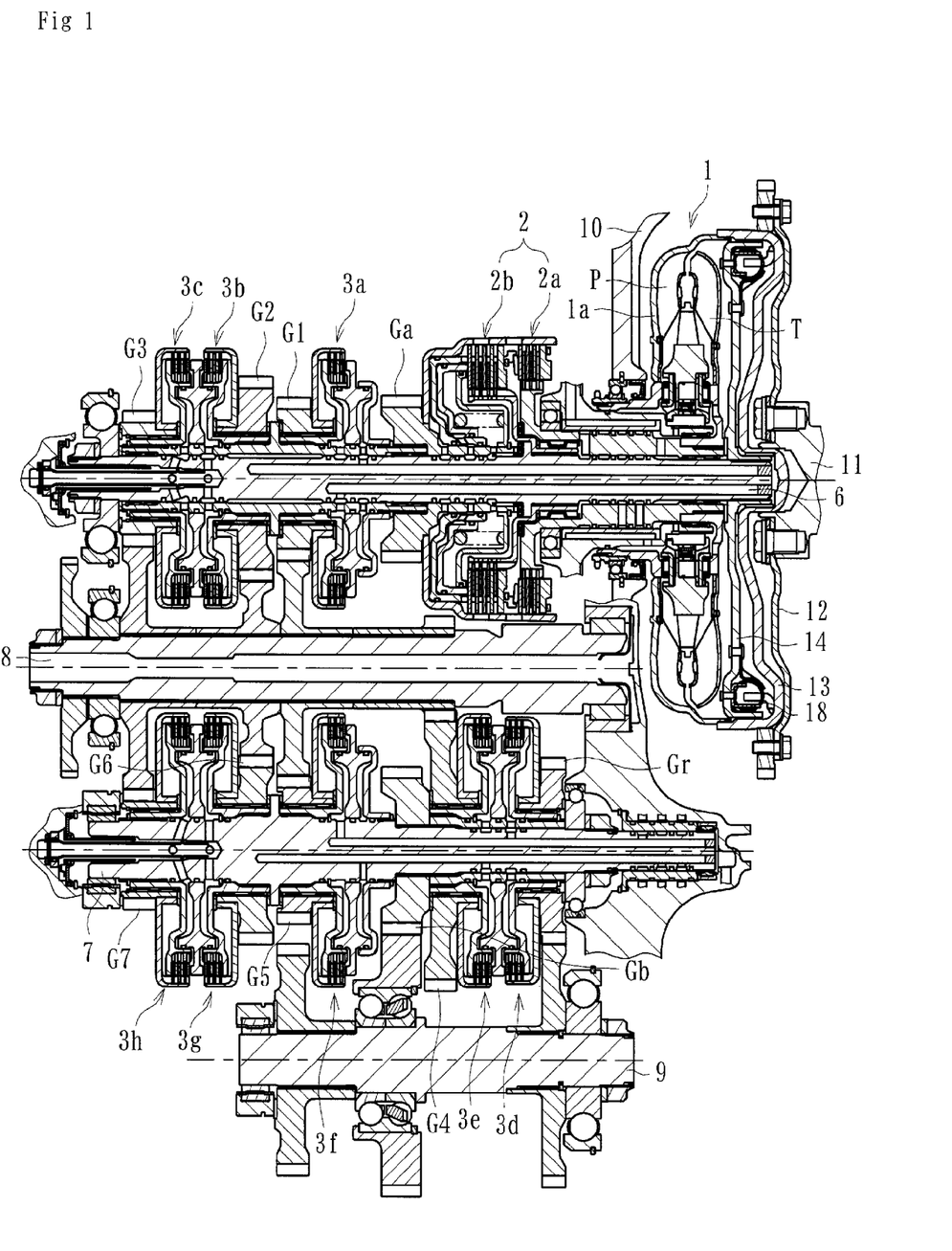
FIG. 1 is a longitudinal-section view showing a power transmitting apparatus according to a first embodiment.

A first embodiment of a power transmitting apparatus can be configured to transmit or cut-off the driving power from an engine (driving source) of an automobile (vehicle) to the wheels (driving wheels). Such an apparatus can include, with reference to FIGS. 1 and 2, a torque converter 1, a starting clutch mechanism (start speed change clutch mechanism) 2, a gear-stage clutch mechanism 3, a control device 4, and a gear-stage selecting device 5. FIG. 1 is a longitudinal-section view showing a power transmitting apparatus according to the first embodiment, and FIG. 2 is a schematic diagram of the power transmitting apparatus of FIG. 1.

Figure 2:
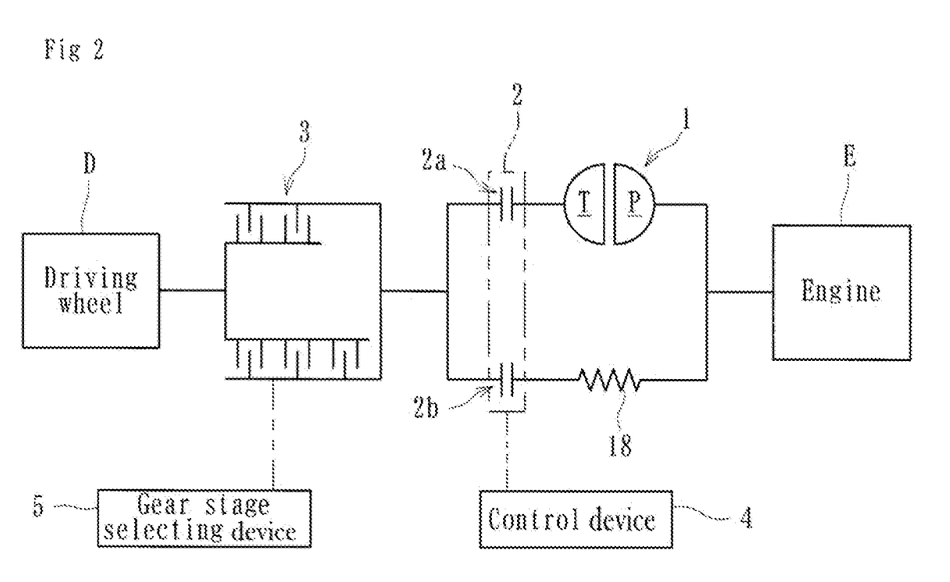
FIG. 2 is a schematic diagram of the power transmitting apparatus of FIG. 1.

As shown in FIGS. 1 and 2, the torque converter 1, the starting clutch mechanism 2, and the gear-stage clutch mechanism 3 can be configured to transmit power from the engine E as a driving source of a vehicle to wheels (driving wheels D). In FIG. 1, a reference numeral 11 denotes an input shaft extending from the engine E and a reference numeral 8 denotes an output shaft extending to the driving wheels D. The torque converter 1 can provide a torque amplifying function for amplifying the torque from the engine E and transmitting it to the driving wheels D and is rotated around its shaft by driving force transmitted from the engine E. The torque converter 1 can comprise torque converter covers 1a, 13 for containing a liquid (operating oil). A pump P can be formed on the side of the torque converter cover 1a and rotated together with the torque converter cover 1a. A turbine T can be arranged oppositely to the pump P and rotatable at a side of the torque converter cover 13.

The input shaft 11 can be connected to the torque converter cover 13 through a cover member 12. When the driving force of the engine E rotates the input shaft 11, the cover member 12, the torque converter covers 13, 1a and the pump P are rotated. The rotational torque is thus transmitted to the turbine T through the liquid (operating oil) with the torque being amplified. The turbine T is then rotated by the amplified torque and thus the amplified torque is transmitted to the transmission 2 through a first driving shaft 5 spline-fitted with the turbine T. The term "power transmitting system of the torque converter" used herein means a power transmitting system formed by the torque converter cover 1a, the pump P and turbine T. Reference numeral 10 in FIG. 1 denotes a transmission case.

On the other hand, the torque converter cover 13 is connected to a connecting member 14 through the damper mechanism 18 comprising coil springs and the connecting member 14 can be further spline-fitted with an outer circumferential surface of a second driving shaft 16 via the first input shaft 6. Accordingly, when the input shaft 11 is rotated by the driving power of the engine E, the cover member 12, the torque converter cover 13, the connecting member 14 and the second driving shaft 16 are rotated, and thus the driving torque of the engine E is transmitted to the gear-stage clutch mechanism 3. That is, the second driving shaft 16 can transmit the driving power of the engine E to the driving wheels D without the power transmitting system of the torque converter 1.

As described above, the first driving shaft 15 can be rotated by the driving power of the engine E through the power transmitting system of the torque converter 1 and connected to a first clutch device 2a, and the second driving shaft 16 can be directly rotated by the driving power of the engine E without the power transmitting system of the torque converter 1 and connected to the second clutch device 2b of the starting clutch mechanism 2.

The starting clutch mechanism 2 can be configured to transmit or cut off the driving power of the engine E to the driving wheels D at selected times and can comprise the first clutch device 2a for transmitting the driving power of the engine E to the driving wheels D through the power transmitting system of the torque converter 1 and a second clutch device 2b for transmitting the driving power of the engine E to the driving wheels D without the power transmitting system of the torque converter 1. The first and second clutch devices 2a, 2b respectively comprise a plurality of driving clutch discs 2aa, 2ba and a plurality of driven clutch discs 2ab, 2bb slidable to right and left directions in the drawings, and thus each form multiple disc clutches.

In the first clutch device 2a, the driving clutch discs 2aa can be mounted on an interlocking member 15a formed on the first driving shaft 15 and interlocking therewith, and the driven clutch discs 2ab can be mounted on a housing 17. These driving clutch discs 2aa and driven clutch discs 2ab can be alternately arranged with each other to form a laminated structure and can be press-contacted and separated with each other.

Meanwhile, in the second clutch device 2b, the driving clutch discs 2ba can be mounted on an interlocking member 16a formed on the second driving shaft 16 and interlocking therewith, and the driven clutch discs 2bb can be mounted on the housing 17. These driving clutch discs 2ba and the driven clutch discs 2bb can be alternately arranged with each other to form a laminated structure and can be press-contacted and separated with each other. The term "separated" used herein means a condition in which a pressure applied to the clutch discs is released while the clutch discs may remain in contact with each other, for example, while slipping. Thus, the term "separated" is not limited only to a physically separated condition. The transmission of driving force is allowed under the press-contacted condition and cut off under the separated condition.

Figure 3:
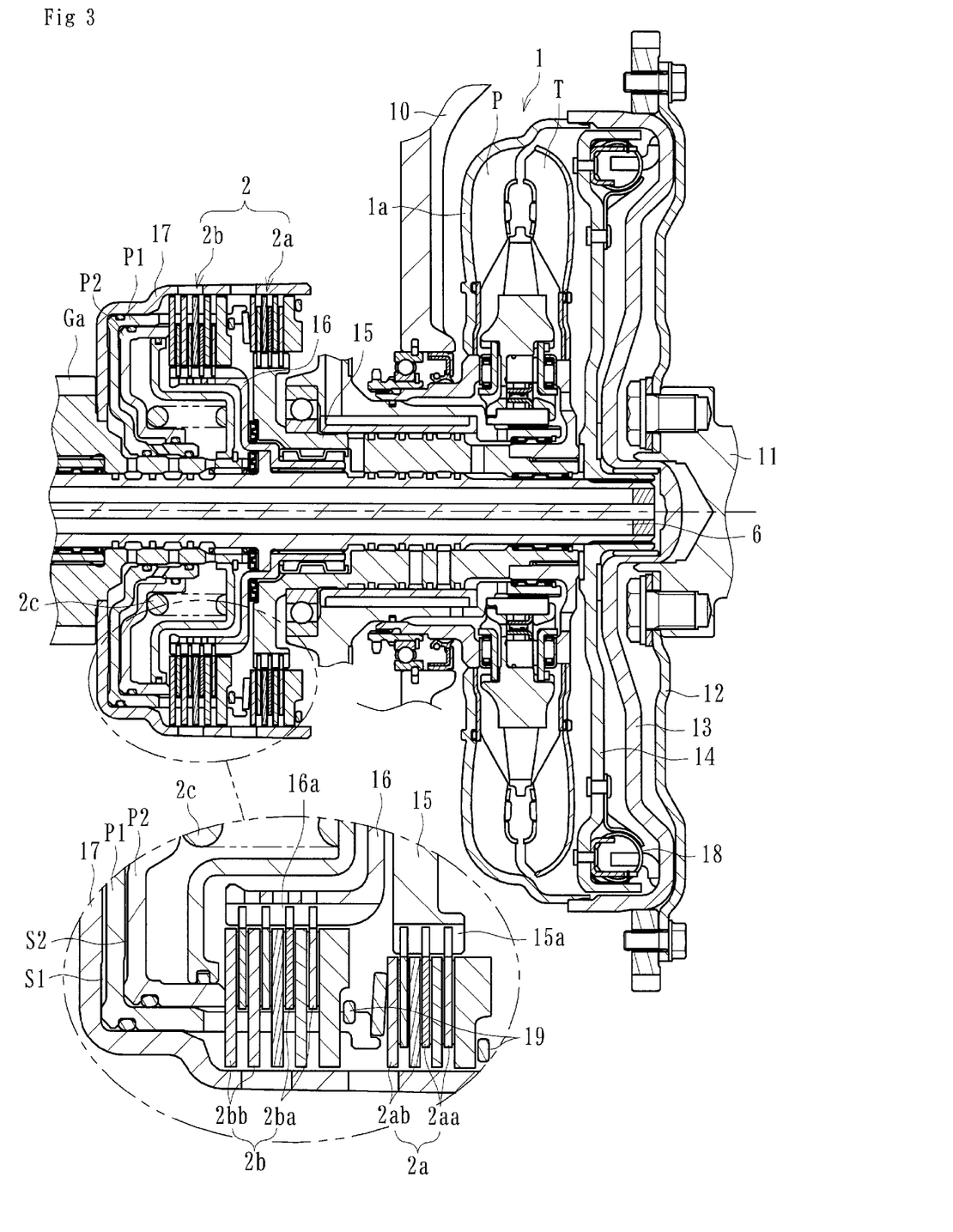
FIG. 3 is an enlarged view showing a torque converter and a starting clutch mechanism of the power transmitting apparatus of FIG. 1.

As shown in FIG. 3, the starting clutch mechanism 2 can comprise the first clutch device 2a, the second clutch device 2b and two hydraulic pistons P1, P2 corresponding respectively to the first and second clutch devices 2a, 2b which are all contained in the same housing 17. The first and second clutch devices 2a, 2b can be selectively actuated by controlling the hydraulic pressure for actuating the hydraulic pistons P1, P2.

For example, the hydraulic piston P1 can be moved toward the right in FIG. 3 against an urging force of a return spring 2c by supplying the operating oil into a hydraulic chamber S1 between the housing 17 and the hydraulic piston P1. Thus the first clutch device 2a can be pressed by tips formed on the hydraulic piston P1 to press-contact the driving clutch discs 2aa and the driven clutch discs 2ab against each other. The tips formed on the hydraulic piston P1 can be passed through recesses (not shown) formed on the peripheries of the driving clutch discs 2ba and the driven side clutch discs 2bb of the second clutch device 2b.

The hydraulic piston P2 is moved toward the right in FIG. 3 against an urging force of a return spring 2c by introducing the operating oil into a hydraulic chamber S2 between the hydraulic piston P1 and the hydraulic piston P2, and thus the second clutch device 2b can be pressed by tips formed on the hydraulic piston P2 to press-contact the driving clutch discs 2ba and the driven clutch discs 2bb against each other. Thus the first clutch device 2a and the second clutch device 2b can be selectively actuated by controlling the hydraulic pressures operating the hydraulic pistons P1 and P2. In other words, the pistons P1 and P2 can change the first and second clutch devices between engaged and disengaged states. In FIG. 3, a reference numeral 19 denotes stoppers arranged at the sides of the first and second clutch devices 2a, 2b. Provision of the stopper 19 at the side of the second clutch 2b enables the second and first clutch devices 2b, 2a to be operated independently from each other.

A housing 17 of the starting clutch mechanism 2 can be connected to a gear Ga mating with a gear formed on the output shaft 8. Thus, the driving power of the engine E transmitted through the first or second clutch devices 2a or 2b can be transmitted to the output shaft 8 through the gear Ga.

The control device 4 can be configured to control the hydraulic oil pressure supplied to each gear-stage clutch mechanism or device 3 and can be configured to selectively operate the first and second clutch device 2a, 2b in accordance vehicle operating conditions. Similar to the gear-stage selecting device 5 described later, the control device 4 can be formed for example by a microcomputer on a vehicle.

The gear-stage clutch mechanism 3 can be positioned operatively to transmit power between the starting clutch mechanism 2 and the driving wheels D and its input (rotational speed of the starting clutch mechanism) and output (rotational speed of the driving wheels) are set at predetermined ratios. The illustrated embodiment, the gear-stage clutch devices 3a-3h can provide eight gear ratios (gear ratios corresponding to 1-7 speeds and reverse). In the drawings, a reference numeral 6 denotes a first input shaft, numeral 7 denotes a second input shaft, numeral 8 denotes an output shaft, and numeral 9 denotes an idle shaft, and gears Ga, Gb are idle gears.

Figure 4:
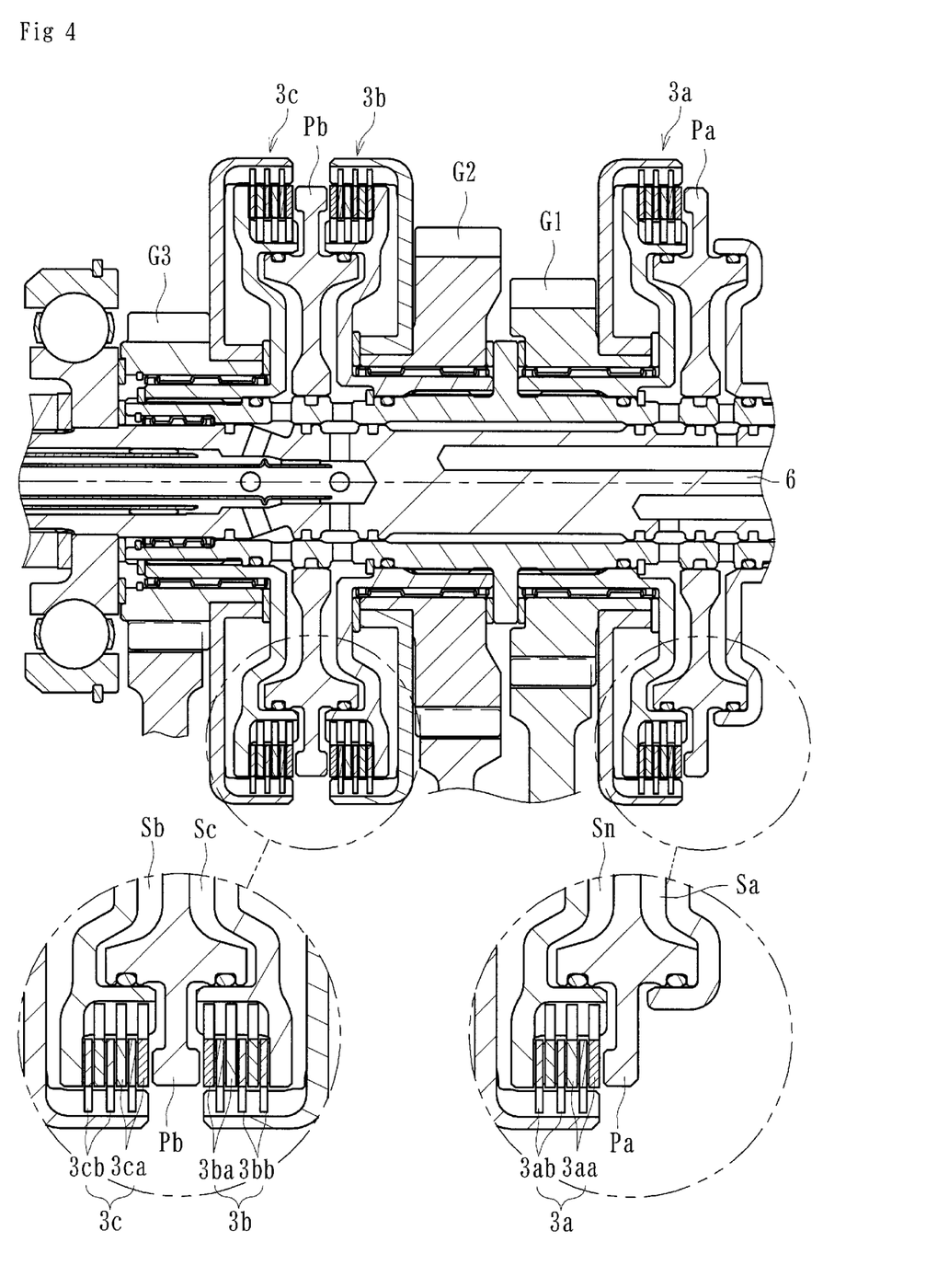
FIG. 4 is an enlarged cross-sectional view showing gear-stage clutch devices (gear-stage clutch devices formed on the first input shaft) of the power transmitting apparatus of FIG. 1.

The gear-stage clutch devices 3a-3c can be formed on the first input shaft 6 as shown in FIG. 4. The gear-stage clutch device 3a can comprise alternately arranged driving clutch discs 3aa and driven clutch discs 3ab and a hydraulic piston Pa driven by hydraulic pressure for selectively engaging or disengaging the driving clutch discs 3aa and driven clutch discs 3ab and can be configured so that driving power can be transmitted to the output shaft 8 through a gear G1 when the driving clutch disc 3aa and the driven clutch disc 3ab are engaged.

For example, the hydraulic piston Pa can be moved toward the left in FIG. 4 by introducing operating oil into a hydraulic chamber Sa, and thus the gear-stage clutch device 3a can be pushed toward the left by the tip end of the hydraulic piston Pa to engage the driving clutch discs 3aa and the driven clutch discs 3ab with each other. Accordingly, the driving power of the first input shaft 6 can be transmitted to the output shaft 8 via the gear G1, and thus power is transmitted at a gear ratio corresponding to the diameter of the gear G1. Also, by introducing oil into a hydraulic chamber Sn the hydraulic piston Pa is returned to its neutral position, and the driving clutch discs 3aa and the driven clutch discs 3ab are disengaged from each other and returned to the neutral position.

The gear-stage clutch device 3b can comprise alternately arranged driving clutch discs 3ba and driven clutch discs 3bb and a hydraulic piston Pb driven by hydraulic pressure for selectively engaging or disengaging the driving clutch discs 3ba and driven clutch discs 3bb and can be configured so that the driving power can be transmitted to the output shaft 8 via a gear G2 when the driving clutch discs 3ba and the driven clutch discs 3bb are engaged. In addition, the gear-stage clutch device 3c can comprise alternately arranged driving clutch discs 3ca and driven clutch discs 3cb and a hydraulic piston Pb driven by hydraulic pressure for selectively engaging or disengaging the driving clutch discs 3ca and driven clutch discs 3cb and can be configured so that driving power can be transmitted to the output shaft 8 via a gear G3 when the driving clutch discs 3ca and the driven clutch discs 3cb are engaged.

The hydraulic piston Pb can be moved toward the right in FIG. 4 by introducing operating oil into a hydraulic chamber Sb, and thus the gear-stage clutch device 3b can be pushed toward the right by the tip end of the hydraulic piston Pb to engage the driving clutch discs 3ba and the driven clutch discs 3bb with each other. On the other hand, the hydraulic piston Pb can be moved toward the left in FIG. 4 by introducing operating oil into a hydraulic chamber Sc, and thus the gear-stage clutch device 3c can be pushed toward the left by the tip end of the hydraulic piston Pb to engage the driving clutch discs 3ca and the driven clutch discs 3cb with each other.

Thus, the hydraulic piston Pb can be selectively moved toward the left or right by introducing the operating oil into the hydraulic chamber Sb or Sc to selectively operate the gear-stage clutch devices 3b or 3c. Since the gear-stage clutch devices 3b, 3c can selectively engage the driving clutch discs and driven clutch discs at different gear ratios in accordance with the operating direction of the hydraulic piston Pb, the driving clutch discs and the driven clutch discs of different gear ratios can share the hydraulic piston Pb, and accordingly, the size (especially the axial size) of the power transmitting apparatus and the number of structural elements of the apparatus can be reduced, and thus its manufacturing cost can be reduced. Accordingly, the driving power of the first input shaft 6 can be transmitted to the output shaft 8 via gear G2 or G3 at a gear ratio corresponding to the diameters of the gears G2, G3.

Figure 5:
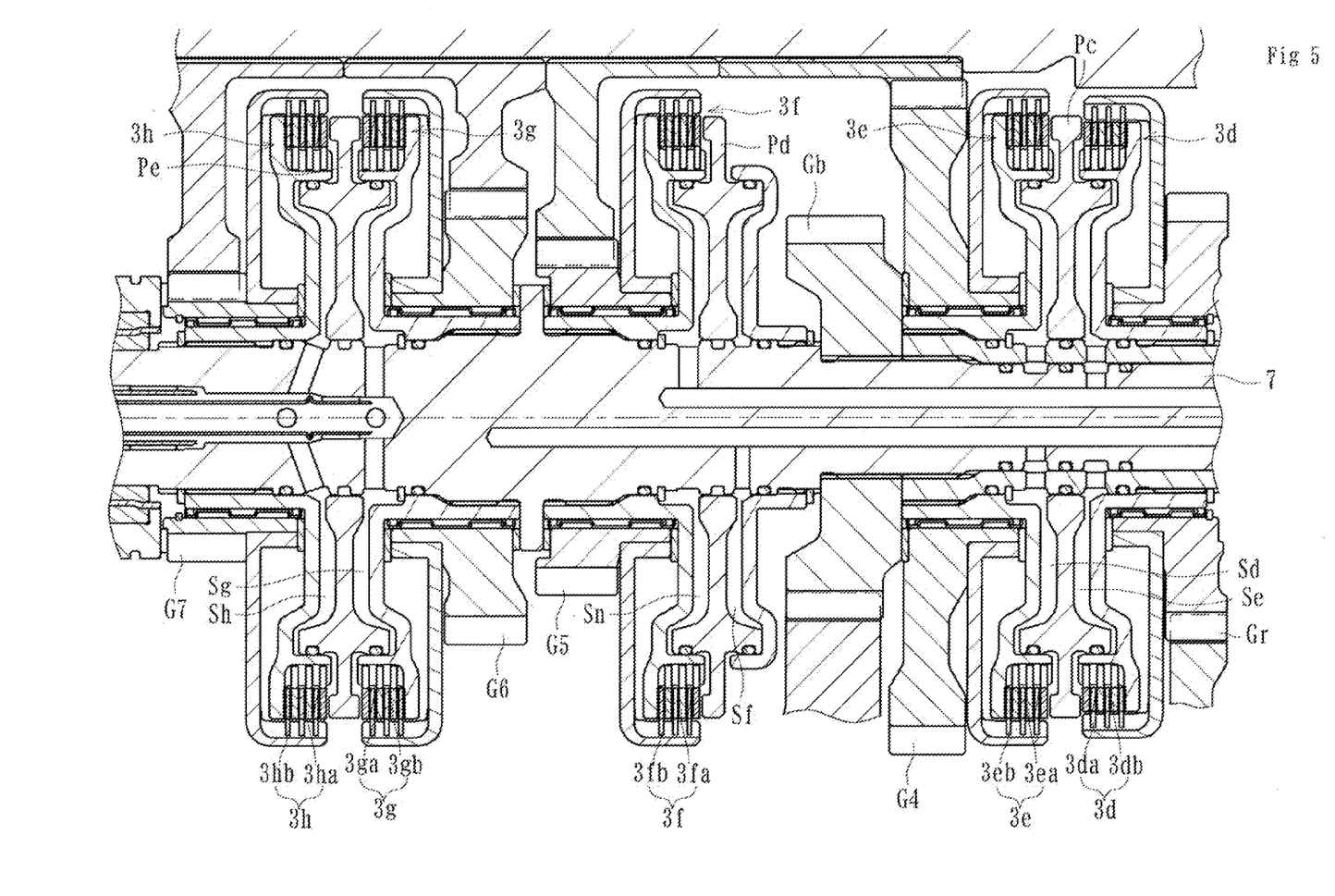
FIG. 5 is an enlarged cross-sectional view showing gear-stage clutch devices (gear-stage clutch devices formed on the second input shaft) of the power transmitting apparatus of FIG. 1.

The second input shaft 7 can be configured to be rotated with the first input shaft 6 by being interlocked therewith. The gear-stage clutch devices 3d-3h can be mounted on the second input shaft 7 as shown in FIG. 5. The gear-stage clutch device 3d can comprise alternately arranged driving clutch discs 3da and driven clutch discs 3db and a hydraulic piston Pc can be operated by hydraulic pressure to selectively engage and disengage the driving clutch discs 3da or driven clutch discs 3db. Accordingly, the gear-stage clutch device 3d can be configured such that when the driving clutch discs 3da and the driven clutch discs 3db are engaged, driving power is transmitted to an idle shaft 9 via a gear Gr, and further transmitted to the output shaft 8 from the idle shaft 9. Similarly, the gear-stage clutch device 3e can comprise alternately arranged driving clutch discs 3ea and driven clutch discs 3eb and the hydraulic piston Pc can be operated by hydraulic pressure to selectively engage and disengage the driving clutch discs 3ea or driven clutch discs 3eb. Accordingly, the gear-stage clutch device 3e can be configured such that when the driving clutch discs 3ea and the driven clutch discs 3eb are engaged, driving power is transmitted to the output shaft 8 via a gear G4.

The hydraulic piston Pc can be moved toward the right in FIG. 5 by introducing operating oil into a hydraulic chamber Sd, and thus the gear-stage clutch device 3d can be pushed toward the right by the tip end of the hydraulic piston Pc to engage the driving clutch discs 3da and the driven clutch discs 3db with each other. On the other hand, the hydraulic piston Pc can be moved toward the left in FIG. 5 by introducing operating oil into a hydraulic chamber Se, and thus the gear-stage clutch devices 3e can be pushed toward the left by the tip end of the hydraulic piston Pc to engage the driving clutch discs 3ea and the driven clutch discs 3eb with each other.

For example, the hydraulic piston Pc can be selectively moved toward the left or right by introducing the operating oil into the hydraulic chamber Sd or Se to selectively operate the gear-stage clutch devices 3d or 3e. Since the gear-stage clutch devices 3d, 3e can selectively engage the driving clutch discs and driven clutch discs at different gear ratios in accordance with the operating direction of the hydraulic piston Pc, the driving clutch discs and the driven clutch discs of different gear ratios can share the hydraulic piston Pc, and accordingly, the size (especially the axial size) of the power transmitting apparatus and the number of structural elements of the apparatus can be reduced, and thus its manufacturing cost can be reduced. In this way, the driving power of the second input shaft 7 can be transmitted to the output shaft 8 via gear Gr or G4 at a gear ratio corresponding to the diameters of the gears Gr, G4. When driving power is transmitted via the gear Gr, a direction of vehicle movement will be reversed and power transmitted at a predetermined gear ratio.

The gear-stage clutch device 3f can comprise alternately arranged driving clutch discs 3fa and driven clutch discs 3fb and a hydraulic piston Pd driven by hydraulic pressure for selectively engaging or disengaging the driving clutch discs 3fa and driven clutch discs 3fb and can be configured so that driving power can be transmitted to the output shaft 8 via a gear G5 when the driving clutch discs 3fa and the driven clutch discs 3fb are engaged.

The hydraulic piston Pd can be moved toward the left in FIG. 5 by introducing operating oil into a hydraulic chamber Sf, and thus the gear-stage clutch device 3f can be pushed toward the left by the tip end of the hydraulic piston Pd to engage the driving clutch discs 3fa and the driven clutch discs 3fb with each other. Accordingly, the driving power of the first input shaft 6 can be transmitted to the output shaft 8 via gear G5 at a gear ratio corresponding to the diameters of the gears G5. The hydraulic piston Pd can be returned to its neutral position and the driving clutch discs 3fa and the driven clutch discs 3fb can be disengaged from each other by introducing operating oil to a hydraulic chamber Sn.

The gear-stage clutch device 3g can comprise alternately arranged driving clutch discs 3ga and driven clutch discs 3gb and a hydraulic piston Pe driven by hydraulic pressure for selectively engaging or disengaging the driving clutch discs 3ga and driven clutch discs 3gb and can be configured so that the driving power can be transmitted to the output shaft 8 via a gear G6 when the driving clutch discs 3ga and the driven clutch discs 3gb are engaged. In addition, the gear-stage clutch device 3h can comprise alternately arranged driving clutch discs 3ha and driven clutch discs 3hb and the hydraulic piston Pe driven by hydraulic pressure for selectively engaging or disengaging the driving clutch discs 3ha and driven clutch discs 3hb and can be configured so that driving power can be transmitted to the output shaft 8 via a gear G7 when the driving clutch discs 3ha and the driven clutch discs 3hb are engaged.

The hydraulic piston Pe can be moved toward the right in FIG. 5 by introduction operating oil into a hydraulic chamber Sh, and thus the gear-stage clutch devices 3g can be pushed toward the right by the tip end of the hydraulic piston Pe to engage the driving clutch discs 3ga and the driven clutch discs 3gb with each other. On the other hand, the hydraulic piston Pe can be moved toward the left in FIG. 5 by introducing operating oil into a hydraulic chamber Sg, and thus the gear-stage clutch devices 3h can be pushed toward the left by the tip end of the hydraulic piston Pe to engage the driving clutch discs 3ha and the driven clutch discs 3hb with each other.

For example, the hydraulic piston Pe can be selectively moved toward the left or right by introducing the operating oil into the hydraulic chamber Sg or Sh to selectively operate the gear-stage clutch devices 3g or 3h. Since the gear-stage clutch devices 3g, 3h can selectively engage the driving clutch discs and driven clutch discs at different gear ratios in accordance with the operating direction of the hydraulic piston Pe, the driving clutch discs and the driven clutch discs of different gear ratios can share the hydraulic piston Pe, and accordingly the size (especially the axial size) of the power transmitting apparatus and the number of structural elements of the apparatus can be reduced, and thus its manufacturing cost can be reduced. In this way, the driving power of the second input shaft 7 can be transmitted to the output shaft 8 via gear G6 or G7 at a gear ratio corresponding to the diameters of the gears G6, G7.

The gear-stage selecting device 5 can control the hydraulic oil pressure supplied to each gear-stage clutch device 3 and can be configured to select any one of the gear-stage clutch devices 3 (gear-stage clutch devices 3a-3h in the illustrated embodiment) in accordance with vehicle operating conditions and selectively set the gear ratio during power transmission from an engine to driving wheels. The gear-stage selecting device 5 can be formed for example by a microcomputer loaded on a vehicle.

Figure 6:
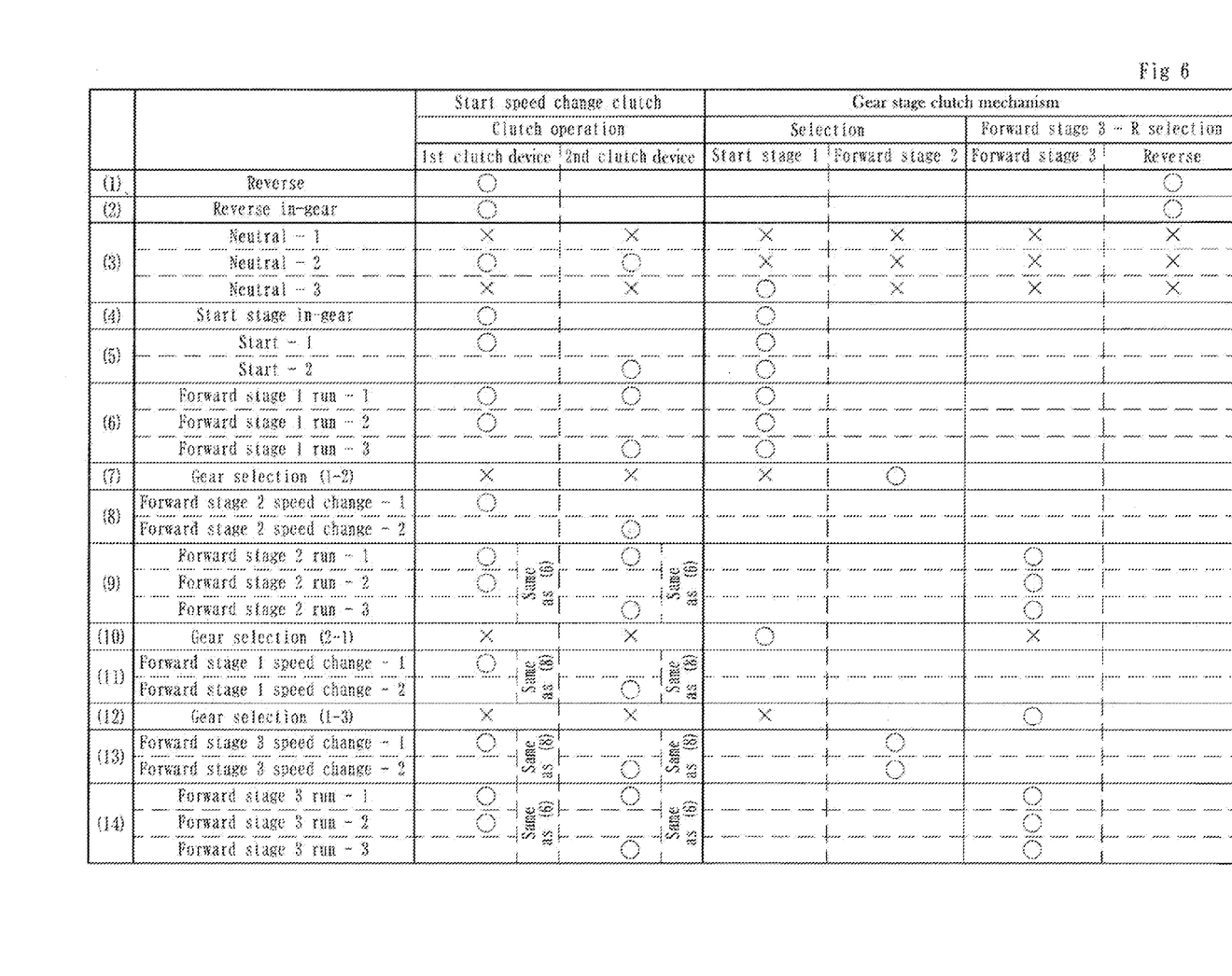
FIG. 6 is a table illustrating modes of the power transmitting apparatus of FIG. 1.

The control device 4 and the gear-stage selecting device 5 can selectively operate the starting clutch mechanism 2 and the gear-stage clutch mechanism 3 according to preset modes as shown in FIG. 6. For example, as shown in item (3) in FIG. 6, three neutral modes 1-3 can be set as neutral conditions and two start modes 1 and 2 can be set as starting modes as in item (5). In addition, three forward stage 1 running modes 1-3 can be set as running conditions as in item (6). Since a plurality of modes can be set, smooth and best fit controls can be achieved by selecting modes according to conditions such as air temperature, operating oil temperature, and so on.

Figure 7:
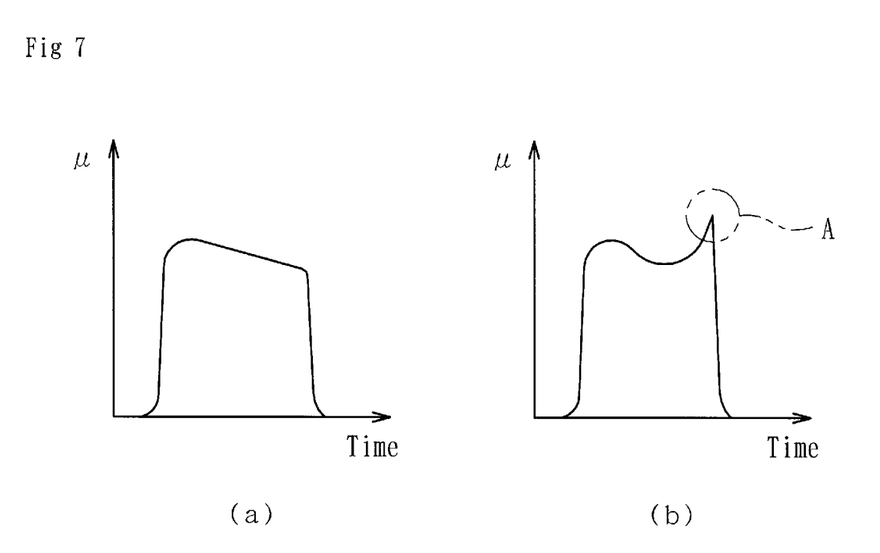
FIG. 7 is a graph illustrating frictional characteristics of a starting clutch mechanism (FIG. 7(a)), and a graph illustrating frictional characteristics of a gear-stage clutch mechanism (FIG. 7(b))

In embodiments of the power transmitting apparatus wherein the starting clutch mechanism 2 absorbs engine torque and engine inertia torque during speed change and the gear-stage clutch mechanism 3 transmits the engine torque and absorbs the transmission inertia torque, the frictional characteristics of the driving clutch discs 2aa, 2ba and the driven clutch discs 2ab, 2bb of the starting clutch mechanism 2 (the first clutch device 2a and the second clutch device 2b) can be different than the frictional characteristics of the driving clutch discs and driven clutch discs of the gear-stage clutch mechanism and devices 3 (the gear-stage clutch devices 3a-3h) as shown in FIG. 7.

For example, the driving clutch discs 2aa, 2ba and the driven clutch discs 2ab, 2bb of the starting clutch mechanism 2 can be made of frictional materials having frictional characteristics that do not cause self-excited vibration (i.e. frictional characteristics wherein the coefficient of dynamic friction continuously decreases with the lapse of time) as shown in FIG. 7(a) such as those comprising paper-like base material of natural fibers such as cotton, wood etc. or synthetic fibers blended with organic or inorganic frictional performance-improving materials and impregnated or cured by phenolic resin. A frictional material having high coefficient of friction and stable in bearing pressure, temperature and peripheral velocity can be obtained by applying frictional materials such as those to the driving clutch discs 2aa, 2ba and the driven clutch discs 2ab, 2bb of the starting clutch mechanism 2.

On the other hand, the driving clutch discs and driven clutch discs of the gear-stage clutch mechanism and devices 3 can be made of frictional materials having frictional characteristics (FIG. 7(b)) wherein the coefficient of dynamic friction (dynamic $\mu$) is substantially the same as that of the driving clutch discs 2aa, 2ba and the driven clutch discs 2ab, 2bb of the starting clutch mechanism 2 except for having "rooster tail" characteristics (see the encircled portion A in FIG. 7(b)) exhibiting a higher peak than that during an initial time period (i.e. a tendency to increase with the lapse of time). These materials have elasticity and small specific gravity and may be made by bonding cork powder e.g. by rubber or resin. Driving clutch discs and driven clutch discs of the gear-stage clutch mechanism and devices 3 having a high coefficient of friction in oil can be obtained by applying these materials to the driving clutch discs and driven clutch discs of the gear-stage clutch mechanism and devices.

Preferable characteristics can be provided to the starting clutch mechanism and the gear-stage clutch mechanism by selectively applying the materials described above to them. For example, unlike the starting clutch mechanism 2 to which the engine torque and the engine inertia torque are applied, transmission inertia torque and transmission torque (i.e. static $\mu$) are applied to the gear-stage clutch mechanism 3, therefore the gear-stage clutch devices 3 can be configured to have a small heat capacity. Thus, the size of the power transmitting apparatus can be reduced.

In embodiments where the gear-stage clutch mechanism 3 comprises alternately arranged driving clutch discs and driven clutch discs, and hydraulic pistons (Pa-Pe) configured to selectively engage or disengage the driving clutch discs and driven clutch discs, and the driving power of the engine is transmitted to the wheels at a predetermined gear ratio with the driving clutch discs and driven clutch discs being engaged, the power transmitting efficiency can be improved, especially compared with the AT-type power transmitting apparatus, and the time lag for shifting speeds can be reduced compared with the AMT-type power transmitting apparatus.

In embodiments where the starting clutch mechanism 2 comprises a first clutch device 2a for transmitting the driving power of engine E to the wheels through a power transmitting system of the torque converter 1, a second clutch device 2b for transmitting the driving power of engine E to the wheels without the power transmitting system of the torque converter 1, and a control device 4 for selectively actuating the first and second clutch devices 2a, 2b in accordance with a vehicle operating condition, a load on the starting clutch mechanism 2 can be reduced by sharing the load between the first and second clutch device 2a, 2b and the time lag for shifting speeds can be reduced.

In embodiments where the hydraulic chamber and the oil pressure cancelling chamber for cancelling the oil pressure applied to the hydraulic pistons (Pa-Pe) are shared in the gear-stage clutch mechanism 3 (3a-3h), an independently arranged cancelling chamber can be omitted, and thus the size of the power transmitting apparatus can be reduced. In some embodiments, wavy driving and driven clutch discs can be used in the gear-stage clutch devices 3 (3a-3h). In such embodiments, the driving and driven clutch discs can be separated from each other without using any return spring, and thus friction can be reduced due to reduction of contact area during the disengaged condition.

Synchronization noise can be reduced and generation of meshing noise of a dog clutch can be avoided compared with prior power transmitting apparatuses in which the gear ratio is set by selecting the gear stage using the synchronizing mechanism and dog clutch. In some embodiments, so-called "jumping shift" (discontinuous speed shift e.g. from a first stage to a third stage) can be easily performed.

Figure 8:
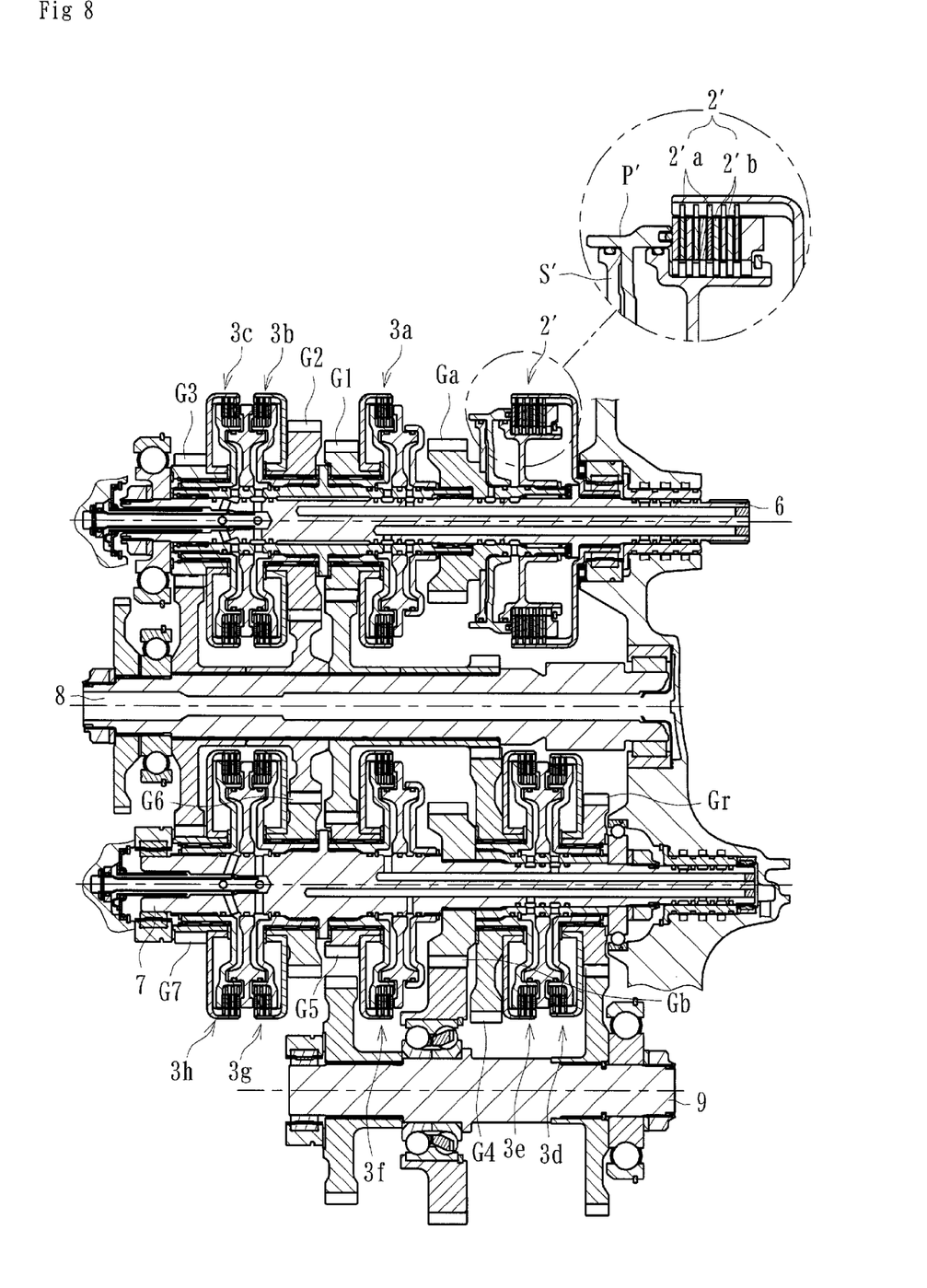
FIG. 8 is a longitudinal-section view showing a power transmitting apparatus according to a second embodiment.
Figure 9:
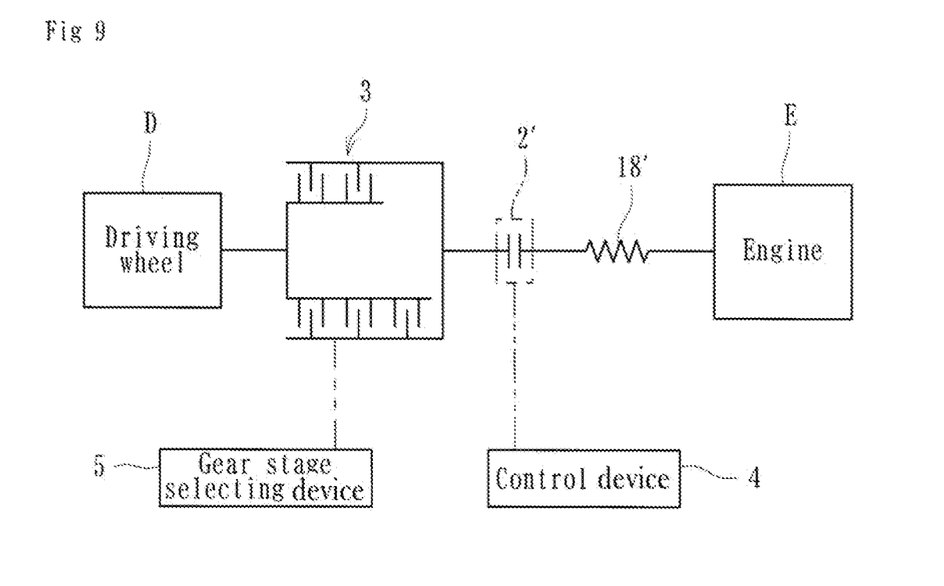
FIG. 9 is a schematic diagram of the power transmitting apparatus of FIG. 8.

Similar to the first embodiment, a second embodiment of a power transmitting apparatus can be configured to transmit or cut-off the driving power from an engine (driving source) of an automobile (vehicle) to the wheels (driving wheels). Such an apparatus can include, with reference to FIGS. 8 and 9, a starting clutch mechanism (start speed change clutch mechanism) 2', a gear-stage clutch mechanism 3, a control device 4, a gear-stage selecting device 5, and a damper mechanism 18'. FIG. 8 is a longitudinal-section view showing the power transmitting apparatus according to the second embodiment, and FIG. 9 is a schematic diagram of the power transmitting apparatus of the second embodiment. Elements of the power transmitting apparatus of the second embodiment that are the same as those of the first embodiment are designated by the same reference numerals as those of the first embodiment and a description of them is not repeated.

The starting clutch mechanism 2' can be configured to transmit or cut off the driving power of engine (power source) E to or from the driving wheels D at selected times and can comprise, as shown in FIG. 8, a hydraulic piston P', a hydraulic chamber S' for moving the hydraulic piston P' toward the right in FIG. 8, driving clutch discs 2'a, and driven clutch discs 2'b. The driving clutch discs 2'a and the driven clutch discs 2'b can be engaged with each other by introducing the operating oil into the hydraulic chamber S' to move the hydraulic piston P'. Accordingly, the starting clutch mechanism 2', similar to the first embodiment, can transmit or cut off the driving power of engine E to the driving wheels D at selected times under the control of the control device 4.

As with the first embodiment, where the gear-stage clutch mechanism 3 of the second embodiment comprises alternately arranged driving clutch discs and driven clutch discs, and hydraulic pistons (Pa-Pe) operated by hydraulic pressure to engage and disengage the driving clutch discs and the driven clutch discs and configured so that the driving power is transmitted at a predetermined gear ratio with the driving clutch discs and the driven clutch discs being engaged, the power transmitting efficiency can be improved and the time lag for shifting speeds can be reduced.

Figure 10:
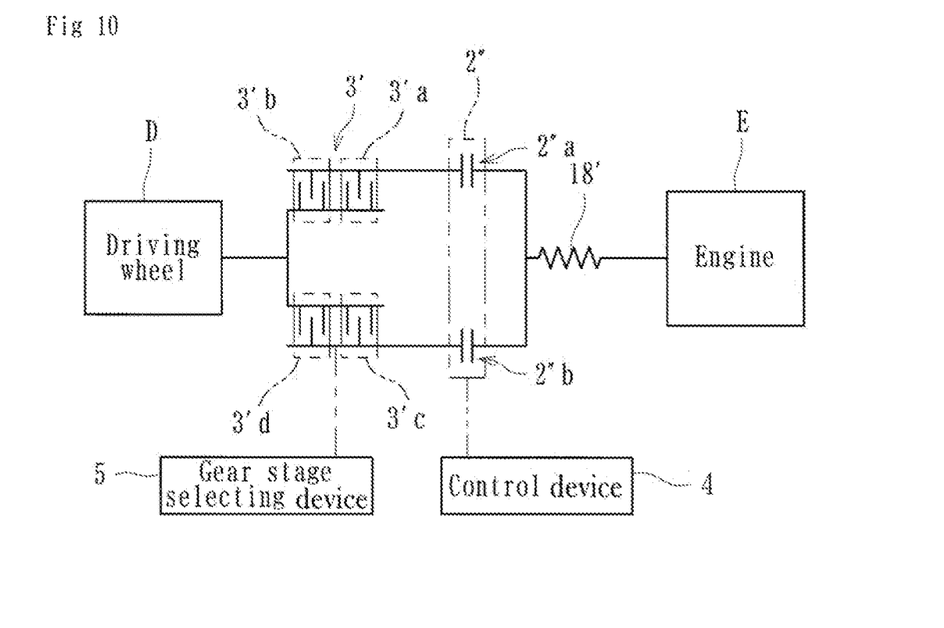
FIG. 10 is a schematic diagram of power transmitting apparatus of a third embodiment.

Similar to the first and second embodiments, a third embodiment of a power transmitting apparatus can be configured to transmit or cut-off the driving power from an engine (driving source) of an automobile (vehicle) to the wheels (driving wheels). Such an apparatus can include, with reference to FIG. 10, a starting clutch mechanism (start speed change clutch mechanism) 2", a gear-stage clutch mechanism 3', a control device 4, a gear-stage selecting device 5, and a damper mechanism 18'. FIG. 10 is a schematic diagram of the power transmitting apparatus of the third embodiment. Elements of the power transmitting apparatus of the third embodiment that are the same as those of the first and second embodiments are designated by the same reference numerals as those of the first and second embodiments and a description of them is not repeated.

In the gear-stage clutch mechanism 3', the gear-stage clutch devices 3'a (2-nd and 4-th stages) and 3'b (6-th speed, and R (reverse)) can be configured for even-number stages and gear-stage clutch devices 3'c (1-st and 3-rd stages) and 3'd (5-th and 7-th stages) can be configured for odd-number stages. Similar to the first and second embodiments, each of the gear-stage clutch devices (3'a-3'd) can comprise alternately arranged driving clutch discs and driven clutch discs, and hydraulic pistons operated by hydraulic pressure for selectively engaging and disengaging the driving clutch discs and driven clutch discs and can be configured so that driving power can be transmitted at predetermined gear ratios with the driving clutch discs and driven clutch discs being engaged.

The starting clutch mechanism 2" can comprise a first clutch device 2"a for even-number stages connectable with the gear-stage clutch devices 3'a, 3'b of even-number stages and a second clutch device 2"b for odd-number stages connectable with the gear-stage clutch devices 3'c, 3'd of odd-number stages. Thus, according to the third embodiment, similar to the first and second embodiment, a load on the starting clutch mechanism can be reduced by sharing the load between the first clutch device for even-number gear stages and the second clutch device for odd-number gear stages and the time lag for shifting speeds can be reduced.

Although the present inventions have been described above with reference to certain embodiments of a power transmission system of a vehicle, the present inventions are not limited to those embodiments described and shown herein. For example, the gear-stage clutch devices can be configured so that they do not use a shared hydraulic piston (i.e. so that they use a dedicated hydraulic piston for each gear-stage clutch device). In addition, other layouts can be applied to the gear-stage clutch mechanism and devices and their number (i.e. the number of speed shift stages) can be any plural number (e.g. 1-3 stages or 1-4 stages).

What is claimed is:

1. A power transmitting apparatus, comprising:
   a starting clutch mechanism configured to selectively transmit and cut off driving power from an engine to wheels of a vehicle;
   a torque converter;
   a plurality of gear-stage clutch devices that are separate from the starting clutch mechanism and operatively positioned to transmit power between the starting clutch mechanism and the wheels, an input and an output of the plurality of gear-stage clutch devices configured at predetermined gear ratios; and
   a gear stage selecting device configured to select any one of the gear-stage clutch devices in accordance with a vehicle operating condition and selectively set a gear ratio for power transmission from the engine to the wheels;
   wherein the gear-stage clutch devices comprise:
      alternately arranged driving clutch discs and driven clutch discs; and
      hydraulic pistons configured to selectively engage or disengage the driving clutch discs and driven clutch discs such that driving power of the engine is transmitted to the wheels at a corresponding predetermined gear ratio when the driving clutch discs and driven clutch discs are engaged.

2. The power transmitting apparatus of claim 1, wherein the gear-stage clutch devices are configured to selectively engage the driving clutch discs and driven clutch discs at different gear ratios in accordance with an operating direction of the hydraulic pistons.

3. The power transmitting apparatus of claim 2, wherein the starting clutch mechanism comprises a first clutch device for transmitting driving power of engine to the wheels through the torque converter, a second clutch device for transmitting driving power of engine to the wheels without a power transmitting system of the torque converter, and a control device for selectively actuating the first and second clutch device in accordance with a vehicle operating condition.

4. The power transmitting apparatus of claim 2, wherein the starting clutch mechanism comprises a first clutch device for even-number gear stages connectable with gear-stage clutch devices of even-number stages and a second clutch device for odd-number gear stages connectable with gear-stage clutch devices of odd-number stages.

5. The power transmitting apparatus of claim 2, wherein the starting clutch mechanism comprises frictional materials having first frictional characteristics wherein a first coefficient of dynamic friction continuously diminishes as time elapses, and wherein the gear-stage clutch devices comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period.

6. The power transmitting apparatus of claim 1, wherein the starting clutch mechanism comprises a first clutch device for transmitting driving power of engine to the wheels through the torque converter, a second clutch device for transmitting driving power of engine to the wheels without a power transmitting system of the torque converter, and a control device for selectively actuating the first and second clutch device in accordance with a vehicle operating condition.

7. The power transmitting apparatus of claim 6, wherein the starting clutch mechanism comprises frictional materials having first frictional characteristics wherein a first coefficient of dynamic friction continuously diminishes as time elapses, and wherein the gear-stage clutch devices comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period.

8. The power transmitting apparatus of claim 1, wherein the starting clutch mechanism comprises a first clutch device for even-number gear stages connectable with gear-stage clutch devices of even-number stages and a second clutch device for odd-number gear stages connectable with gear-stage clutch devices of odd-number stages.

9. The power transmitting apparatus of claim 8, wherein the starting clutch mechanism comprises frictional materials having first frictional characteristics wherein a first coefficient of dynamic friction continuously diminishes as time elapses, and wherein the gear-stage clutch devices comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period.

10. The power transmitting apparatus of claim 1, wherein the starting clutch mechanism comprises frictional materials having first frictional characteristics wherein a first coefficient of dynamic friction continuously diminishes as time elapses, and wherein the gear-stage clutch devices comprise frictional materials having second frictional characteristics wherein a second coefficient of dynamic friction continuously diminishes as time elapses during an initial period and exhibits a "rooster tail" property wherein the second coefficient of dynamic friction has a higher peak than the second coefficient of dynamic friction does in the initial period.

11. The power transmitting apparatus of claim 1, wherein one or more of the hydraulic pistons comprises:
a first pressure side forming a boundary of a first hydraulic chamber; and
a second pressure side forming a boundary of a second hydraulic chamber;
wherein the one or more hydraulic pistons is configured to move in a first direction to engage a first set of driving clutch discs with a first set of driven clutch discs of a first gear stage in response to increased hydraulic pressure in the first hydraulic chamber, and wherein the one or more hydraulic pistons is configured to move in a second direction to engage a second set of driving clutch discs with a second set of driving clutch discs of a second gear stage in response to increased hydraulic pressure in the second hydraulic chamber.

12. The power transmitting apparatus of claim 1, wherein one or more of the hydraulic pistons is configured to be driven by hydraulic pressure acting directly on one or more surfaces of the one or more hydraulic pistons.

13. The power transmitting apparatus of claim 1, wherein one or more of the gear stage clutches comprises at least a first carrier supporting at least one of the driving clutch discs and the driven clutch discs, wherein at least one of the hydraulic pistons has a first side and a second side, and wherein a first hydraulic chamber is disposed between the first side of the at least one hydraulic piston and a first side of the first carrier.

14. The power transmitting apparatus of claim 1, additionally comprising at least a first shaft and at least first and second pairs of gear-stage gears defining first and second gear ratios, respectively, where one gear of each of the first and second pairs of gear-stage gears are disposed about the first shaft, and wherein at least one of the gear stage clutch device, including a corresponding hydraulic piston, is disposed about the first shaft and directly between the first and second pairs of gear-stage gears.

\* \* \* \* \*